US007973795B2

(12) United States Patent
Miyazawa

(10) Patent No.: US 7,973,795 B2
(45) Date of Patent: Jul. 5, 2011

(54) IMAGE DISPLAY SYSTEM, IMAGE DISPLAY APPARATUS, AND IMAGE CORRECTION PROCESSING PROGRAM

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 1281 days.

(21) Appl. No.: 11/539,508

(22) Filed: Oct. 6, 2006

(65) Prior Publication Data
US 2007/0091107 A1 Apr. 26, 2007

(30) Foreign Application Priority Data

Oct. 7, 2005 (JP) ................................ 2005-295231
Aug. 28, 2006 (JP) ................................ 2006-230623

(51) Int. Cl.
*G09G 5/00* (2006.01)
*G06K 9/40* (2006.01)
*G06K 9/36* (2006.01)
*G03B 21/14* (2006.01)

(52) U.S. Cl. ........ 345/581; 345/204; 345/618; 382/254; 382/274; 353/69

(58) Field of Classification Search .................. 345/428, 345/581, 617–618, 619, 204, 690; 348/744, 348/807; 358/519, 537–539, 447–448, 452, 358/453; 715/273, 275; 382/254, 274, 276; 353/69, 30, 98; 356/124
See application file for complete search history.

(56) References Cited

U.S. PATENT DOCUMENTS

| 5,818,525 | A | * | 10/1998 | Elabd | 348/268 |
| 6,661,425 | B1 | * | 12/2003 | Hiroaki | 345/629 |
| 7,139,137 | B2 | * | 11/2006 | Sudoh | 359/811 |
| 7,170,535 | B2 | | 1/2007 | Matsuda | |
| 7,663,670 | B1 | * | 2/2010 | Orboubadian | 348/231.2 |
| 7,742,056 | B2 | * | 6/2010 | Miyazawa | 345/581 |
| 2005/0190830 | A1 | * | 9/2005 | Miyashita et al. | 375/228 |
| 2007/0097354 | A1 | * | 5/2007 | Sudoh | 356/124 |

FOREIGN PATENT DOCUMENTS

| JP | A-2004-069996 | 3/2004 |
| JP | A-2004-228948 | 8/2004 |
| JP | A-2005-148218 | 9/2005 |

* cited by examiner

*Primary Examiner* — Wesner Sajous
(74) *Attorney, Agent, or Firm* — Oliff & Berridge PLC

(57) ABSTRACT

An image display system includes: an information processing apparatus that performs a predetermined image correcting process on image data; an image display apparatus that displays an image on the basis of the image data corrected by the information processing apparatus; and a signal transmitting member that connects the information processing apparatus and the image display apparatus and transmits signals therebetween. The information processing apparatus includes: a first image correction processing unit that performs a predetermined image correcting process on the image data; and a transmission data generating unit that compresses the image data corrected by the first image correction processing unit to generate transmission data to be transmitted to the image display apparatus through the signal transmitting member. The image display apparatus includes: an image generating unit that generates the image data on the basis of the transmission data generated by the transmission data generating unit; and a second image correction processing unit that performs at least one of a ghost correcting process and a cross talk correcting process on the image data. The first image correction processing unit performs image correcting processes other than the ghost correcting process and the cross talk correcting process performed by the second image correction processing unit.

13 Claims, 5 Drawing Sheets

IMAGE DISPLAY SYSTEM, IMAGE DISPLAY APPARATUS, AND IMAGE CORRECTION PROCESSING PROGRAM

CROSS-REFERENCE TO RELATED APPLICATION

This application claims priority from Japanese Patent Application Serial Nos. 2005-295231 and 2006-230623, filed in the Japanese Patent Office on Oct. 7, 2005 and Aug. 28, 2006, respectively, the entire disclosures of which are hereby incorporated by reference in their entireties.

BACKGROUND

1. Technical Field

The present invention relates to an image display system, an image display apparatus, and an image correction processing program.

2. Related Art

Projectors have been known as image display apparatuses.

There has been known a projection system, serving as an image display system including a personal computer serving as an information processing apparatus for correcting the shape and color of an image source, a projector for projecting the image corrected by the personal computer on a screen, and a UBS cable serving as a data transmitting path between the personal computer and the projector (for example, see JP-A-2004-69996). In the projection system, the image source input to the personal computer is processed by an image processing unit of the personal computer. The image correcting processes include, for example, a keystone correcting process for correction keystone distortion caused by the arrangement relationship between the projector and the screen, a γ correcting process or a VT-γ correcting process for correcting colors on the basis of output characteristics of the projector, a color correcting process for correcting brightness irregularity or color irregularity due to characteristics of a liquid crystal panel, and a ghost correcting process or a cross talk correcting process for correcting color irregularity (ghost or cross talk) caused by the effect of a driving signal on adjacent pixels when pixels of the liquid crystal panel are driven. The image data corrected by the personal computer is transmitted to the projector via the signal transmitting member. The projector projects the transmitted image data onto the screen to display a predetermined image on the screen.

According to the above-mentioned structure, the personal computer mainly performs the image processing, and the projector just projects the image data onto the screen, so that image processing can be easily performed. Therefore, the above-mentioned structure makes it possible to simplify the configuration of the projector. In addition, since the personal computer has a graphic processing function, the personal computer can perform a high-accuracy image correcting process without adding new functions.

In a case in which the image source is a moving picture, when the transmission rate of the USB cable is low, it takes a lot of time to transmit one image data, and thus the frame rate of the images displayed by the projector is lowered, which causes the moving picture not to be appropriately reproduced. For example, a frame rate of 30 frames per second is needed to smoothly reproduce the moving picture. However, a USB 2.0 cable has an insufficient frame rate to transmit all image data. For example, a maximum stable communication speed of the USB 2.0 cable is about 240 Mbps, but in a display resolution of XGA (1024×768 dots), an image having pixels each having color information of 30 bits has data of about 25 Mbits. Therefore, image data is transmitted only at a frame rate of about 9 frames per second, which is a low frame rate.

JP-A-2004-69996 discloses a technique for reducing the amount of necessary transmission data by "transmitting differential data of previous screen data" and thus for keeping the frame rate at an appropriate level (see paragraph [0048] of JP-A-2004-69996). In JP-A-2004-69996, a personal computer generates differential data and transmits the differential data to a projector. Then, the projector synthesizes the received differential data with the previous screen to generate the current frame data, and projects the current frame data onto the screen.

When the personal computer performs all correcting processes on each image data, the image data is corrected to high-resolution image data, but the correcting processes are performed on most of the pixels of the image data. Then, even when the differential data between the previous image data and the current image data is obtained to reduce the amount of data transmitted from the personal computer to the projector, most of the pixels vary due to the previous image data and the current image data.

Therefore, even when the differential data is used, a data compression ratio is lowered, which causes a large amount of transmission data to be transmitted from the personal computer to the projector. As a result, data transmission from the personal computer to the projector is delayed, which causes a problem in that the frame rate of images displayed by the projector is not appropriately kept at a predetermined level.

For this reason, it is considered to lower the degree of image correction such that the differential data is not excessively large, but this is not preferable because the display quality of an image is deteriorated. When rough differential data is obtained such that a minute variation between image frames is not detected when the differential data is obtained, the size of the differential data can be reduced. However, in this case, information may be omitted from the current image data reproduced by the projector. Therefore, this method is also not preferable because the display quality of an image is lowered.

SUMMARY

Arm advantage of some aspects of the invention is that it provides an image display system, an image display apparatus, and an image correction processing program capable of keeping the frame rate of images displayed by an image display apparatus at a predetermined level and improving the display quality of images.

According to an aspect of the invention, an image display system includes: an information processing apparatus that performs a predetermined image correcting process on image data; an image display apparatus that displays an image on the basis of the image data corrected by the information processing apparatus; and a signal transmitting member that connects the information processing apparatus and the image display apparatus and transmits signals therebetween. The information processing apparatus includes: a first image correction processing unit that performs a predetermined image correcting process on the image data; and a transmission data generating unit that compresses the image data corrected by the first image correction processing unit to generate transmission data to be transmitted to the image display apparatus via the signal transmitting member. The image display apparatus includes: an image generating unit that generates the image data on the basis of the transmission data generated by the transmission data generating unit; and a second image correction processing unit that performs at least one of a ghost correcting process and a cross talk correcting process on the image data. The first image correction processing unit performs image correcting processes other than the ghost correcting process and the cross talk correcting process performed by the second image correction processing unit.

In the above-mentioned structure, the information processing apparatus performs a predetermined image correcting process on the image data, and then the corrected image data is transmitted from the information processing apparatus to the projector.

First, the information processing apparatus performs image correcting processes other than a ghost correcting process and a cross talk correcting process among necessary image correcting processes. The first image correction processing unit performs, for example, a resolution converting process, an outline emphasizing process, a white/black expanding process, a color converting process, a γ correcting process, a VT-γ correcting process, and a shape correcting process.

The image data corrected by the first correction processing unit is transmitted to the transmission data generating unit, and the transmission data generating unit generates transmission data compressed in a predetermined format.

For example, a method of calculating the differential data between the previous image data and the current image data is used to compress the image data. The generated transmission data is transmitted to the image display apparatus via the signal transmitting member. In the image display apparatus, the image generating unit generates the current image data on the basis of the transmission data. For example, the image generating unit synthesizes the differential data with the previous image data to gene rate new current image data. The second image correction processing unit performs at least one of the ghost correcting process and the cross talk correcting process on the image data. In this way, the corrected image data is displayed by the image display apparatus.

In the structure of the image display apparatus, color irregularity caused by other pixels is referred to as cross talk or ghost. The cross talk is irregularity in an image occurring when the pixels are driven by a leakage current between adjacent pixels, and the ghost means an overlap of images deviating from each other.

According to the above-mentioned structure, the first image correction processing unit of the information processing apparatus performs, for example, a resolution converting process, an outline emphasizing process, a white/black expanding process, a color converting process, a γ correcting process, and a VT-γ correcting process except for a ghost correcting process and a cross talk correcting process. The image correcting processes include an image correcting process, such as a conversion process for converting the color, brightness, and resolution of each pixel in accordance with display characteristics of the image display apparatus and an image correcting process that is performed on a plurality of adjacent pixels, such as a cross talk correcting process or a ghost correcting process for correcting color irregularity caused by other pixels. In the aspect of the invention, the information processing apparatus mainly performs the image correcting process on each pixel forming an image.

Therefore, in the image correcting process performed by the information processing apparatus, a predetermined conversion process is executed on each pixel data, and thus the difference between a compression ratio of the original image before the image correcting process and a compression ratio of the image after the image correcting process is not significantly large. Therefore, when the information processing apparatus performs the image correcting process on image data, compresses the corrected image data, and transmits the compressed image data to the image display apparatus via the signal transmitting member, the image display apparatus can display an image at an appropriate frame rate.

Since the image display apparatus performs the image correcting processes not performed by the information display apparatus, it is possible to execute all necessary image correcting processes and thus to improve the display quality of an image.

The image data that has been appropriately compressed in a predetermined compression format is transmitted from the information processing apparatus to the image display apparatus via the signal transmitting member. Therefore, it is possible to transmit all data from the information processing apparatus to the image display apparatus without omitting any information. Thus, the image display apparatus can display a high-resolution image on the basis of image data having high-accuracy information.

In the aspect of the invention, since the information processing apparatus performs image correcting processes other than the ghost correcting process and the cross talk correcting process, it is possible to reduce the image processing load of the image display apparatus.

Therefore, it is possible to simplify the structure of an image display apparatus and to realize an inexpensive image display apparatus. When a personal computer is used as the information processing apparatus for performing the image correcting process, an additional image processing function is not needed since the personal computer has a graphic processing function. The graphic processing function of the personal computer makes it possible to process images at high speed and with high accuracy.

In the image display system according to the above-mentioned aspect, preferably, the second image correction processing unit performs at least one of the ghost correcting process and the cross talk correcting process on the image data and then performs a color irregularity correcting process on the image data.

According to the above-mentioned structure, the second image correction processing unit performs at least one of the ghost correcting process and the cross talk correcting process on the image data transmitted from the information processing apparatus to the image display apparatus via the signal transmitting member and then performs the color irregularity correcting process on the image data.

Since it is most effective to perform the color irregularity correcting process in the last stage, the image display apparatus performs the color irregularity correcting process in the last stage, which makes it possible to effectively perform an image correcting process at high speed.

In the image display system according to the above-mentioned aspect, preferably, the information processing apparatus further includes an image correction parameter storage unit that acquires parameters that are used for the first image correction processing unit to perform the image correcting process from the outside of the information processing apparatus and stores the parameters.

In the above-mentioned structure, when the information processing apparatus is composed of a computer having a CPU and a memory, necessary image correction parameters may be installed in the image correction parameter storage unit via a storage medium, such as a CD-ROM or a memory card, or a communication network, such as the Internet, and the installed parameters may allow the CPU to perform the image correcting processes.

When the image display apparatus and the information processing apparatus are operatively connected to each other via the signal transmitting member, the information processing apparatus may acquire the image correction parameters from the image display apparatus.

According to the above-mentioned structure, since the information processing apparatus acquires the image correction parameters from the outside, the information processing apparatus can acquire different image correction parameters depending on individual image display apparatuses and perform image correcting processes corresponding to the individual image display apparatuses.

According to another aspect of the invention, there is provided an image display apparatus that displays an image on the basis of image data that has been subjected to a predetermined image correcting process by an information processing apparatus and is transmitted from the information processing apparatus via a signal transmitting member. The image display apparatus includes an image correction processing unit that performs at least one of a ghost correcting process and a cross talk correcting process on the image data.

According to still another aspect of the invention, there is provided an image display apparatus that displays an image on the basis of image data that has been subjected to a predetermined image correcting process by an information processing apparatus and is transmitted from the information processing apparatus via a signal transmitting member. The image display apparatus includes an image correction processing unit that performs a color irregularity correcting process and at least one of a ghost correcting process and a cross talk correcting process on the image data.

According to the above-mentioned structure, it is possible to achieve an image display apparatus suitable for the image display system.

According to yet another aspect of the invention, there is provided an image correction processing program that allows a computer provided in an image display apparatus which displays an image, on the basis of image data that has been subjected to a predetermined image correcting process by an information processing apparatus and is transmitted from the information processing apparatus via a signal transmitting member, to execute at least one of a ghost correcting process and a cross talk correcting process on the image data.

According to still yet another aspect of the invention, there is provided an image correction processing program that allows a computer provided in an image display apparatus which displays an image, on the basis of image data that has been subjected to a predetermined image correcting process by an information processing apparatus and is transmitted from the information processing apparatus via a signal transmitting member, to execute a color irregularity correcting process and at least one of a ghost correcting process and a cross talk correcting process on the image data.

According to the above-mentioned structure, it is possible to obtain the same effects as described above.

In the above-mentioned structure, a CPU and a memory may be provided in the image display apparatus such that the image display apparatus serves as a computer, a predetermined program may be installed in the memory via a storage medium, such as a CD-ROM or a memory card, or a communication network, such as the Internet, and the installed program may allow the CPU to perform the image correcting processes. In order to install the program, the memory card or the CD-ROM may be directly inserted into the image display apparatus, or an external device for reading the storage medium may be connected to the image display apparatus. Alternatively, the program may be installed in the image display apparatus over a wire communication network, such as a LAN cable or a telephone line or a wireless communication network.

BRIEF DESCRIPTION OF THE DRAWINGS

The invention will be described with reference to the accompanying drawings, wherein like numbers refer like elements.

DESCRIPTION OF EXEMPLARY EMBODIMENTS

Figure 1:
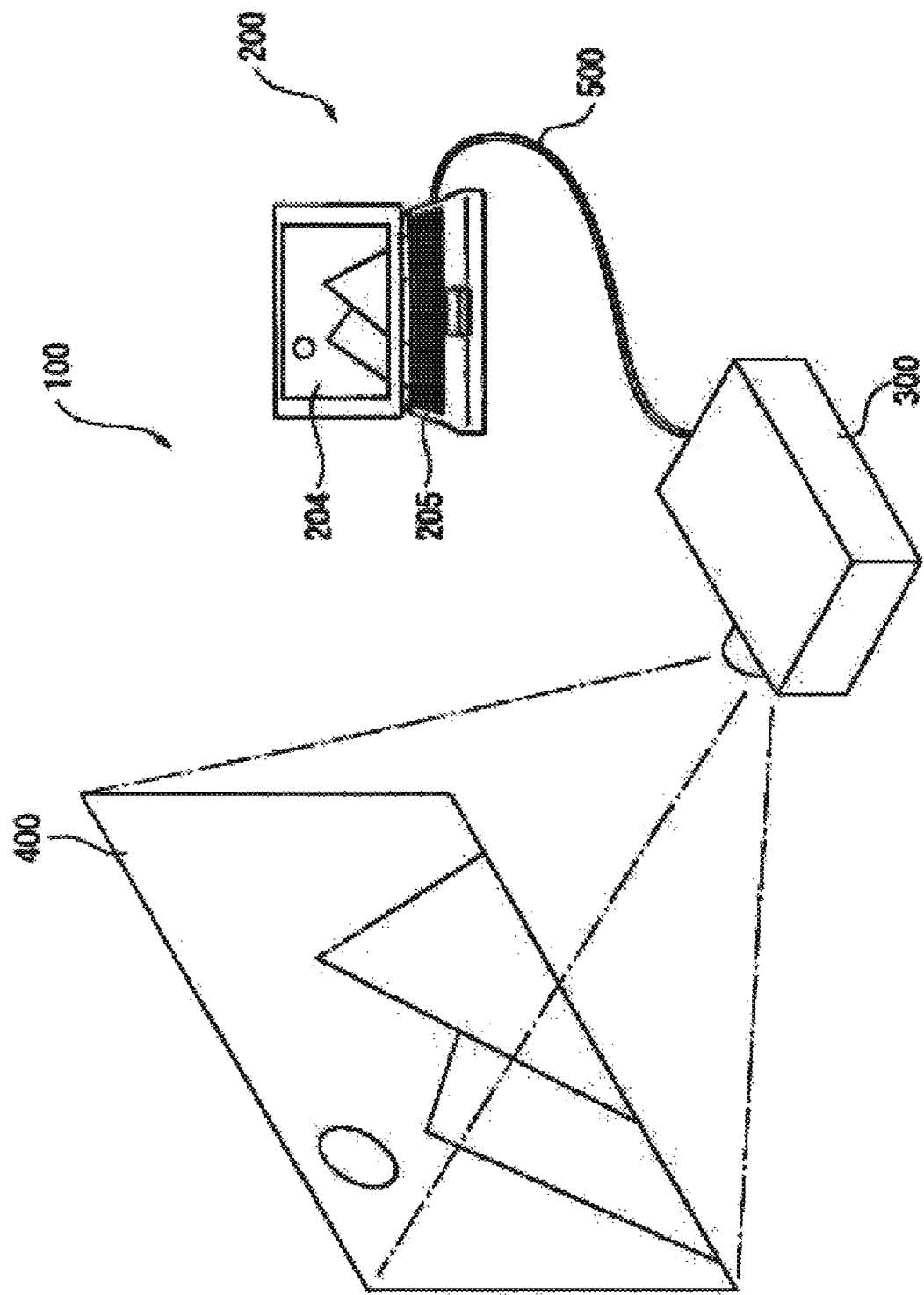
FIG. 1 is a layout view of a projection system according to a first embodiment of the invention.

Hereinafter, preferred embodiments of the invention will be described with reference the accompanying drawings and components having reference numerals shown in the drawings.

First Embodiment

A projection system according to a first embodiment of the invention, which is an example of an image displaying system, will be described below.

FIG. 1 is a layout view illustrating a projection system 100.

Projection system 100 includes a personal computer (information processing apparatus) 200 for performing a predetermined image process on an image of an image source to output image data signals, a projector (image display apparatus) 300 for generating a current image frame on the basis of the image data signals from personal computer 200 having a display device 204 and a keyboard 205, and projecting the generated current image frame onto a screen 400, and a signal transmitting member 500 (e.g., a USB cable, a serial or parallel cable, a wireless transmitter, a data network, and the like) for operatively connecting projector 300 to personal computer 200.

Figure 2:
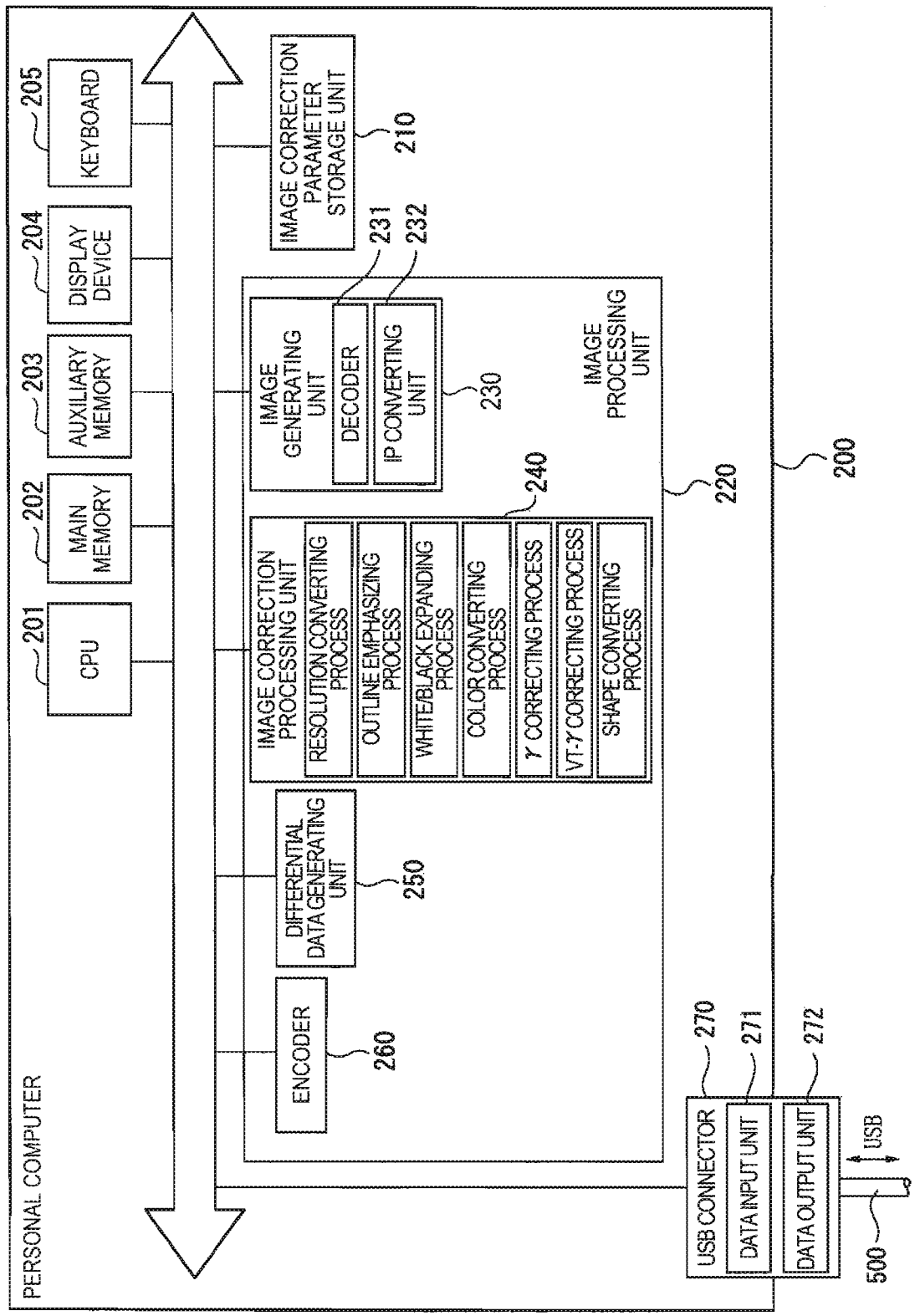
FIG. 2 is a functional block diagram illustrating a personal computer according to the first embodiment of the invention.

As shown in FIG. 2, personal computer 200 includes a CPU 201, a main memory 202, an auxiliary memory 203, display device 204, keyboard 205, an image correction parameter storage unit 210, an image processing unit 220, and a USB connector 270.

A storage medium, which is an image source, is used as auxiliary memory 203. For example, a DVD (digital versatile disc) having digital image and audio data recorded thereon is used as the medium. Image correction parameter storage unit 210 stores correction parameters for correcting images according to the characteristics of projector 300.

The image correcting processes include a correcting process, such as a conversion process for converting the color, brightness, and resolution of each pixel in accordance with display characteristics of projector 300 and a correcting process that is performed on a plurality of adjacent pixels, such as a cross talk correcting process or a ghost correcting process for correcting color irregularity caused by other pixels.

Personal computer 200 mainly performs a correcting process for converting, for example, the color, brightness, and resolution of each of the pixels forming an image.

For example, various parameters for performing, for example, resolution conversion, outline emphasis, white/black expansion, color conversion, γ correction, and VT-γ correction are stored in image correction parameter storage unit 210.

In these correcting processes, predetermined conversion is only performed on data of each pixel, but the size of differential data between image frames of the original image before the correcting process is not very different from the size of differential data between image frames of the image after the correcting process.

In this embodiment, since the difference between the sizes of differential data is not significantly large, personal computer 200 also performs shape correction, and parameters for the shape correction are also stored in image correction parameter storage unit 210.

A memory card or a CD-ROM having these parameters stored therein may be inserted into personal computer 200, and these parameters may be installed in image correction parameter storage unit 210.

Alternatively, when personal computer 200 and projector 300 are operatively connected to each other by signal transmitting member 500, personal computer 200 may read out a predetermined parameter from projector 300 and store the read parameter in image correction parameter storage unit 210.

Image processing unit 200 includes an image generating unit 230, an image correction processing unit 240 (first image correction processing unit), a differential data generating unit (transmission data generating unit) 250, and an encoder 260.

Image generating unit 230 includes a decoder 231 and an IP converting unit 232, and decompresses the image source from auxiliary memory 203 on the basis of a recording mode to decode image frame data one by one. Image correction processing unit 240 corrects the image generated by image generating unit 230 on the basis of the characteristics of projector 300. For example, the correcting processes include a resolution converting process, an outline emphasizing process, a white/black expanding process, a color converting process, a γ correcting process, a VT-γ correcting process, and a shape correcting process.

Differential data generating unit 250 compares the latest image data with the previous image data among the image data corrected by image correction processing unit 240 and detects the difference between the latest image and the previous image as differential data. That is, the differential data includes spatial variation and color variation between the latest image data and the previous image data.

Encoder 260 encodes the differential data generated by differential data generating unit 250. USB connector 270 includes a data input unit 271 and a data output unit 272, and inputs/outputs data to/from projector 300 via signal transmitting member 500.

Next, the structure of projector 300 will be described below.

Figure 3:
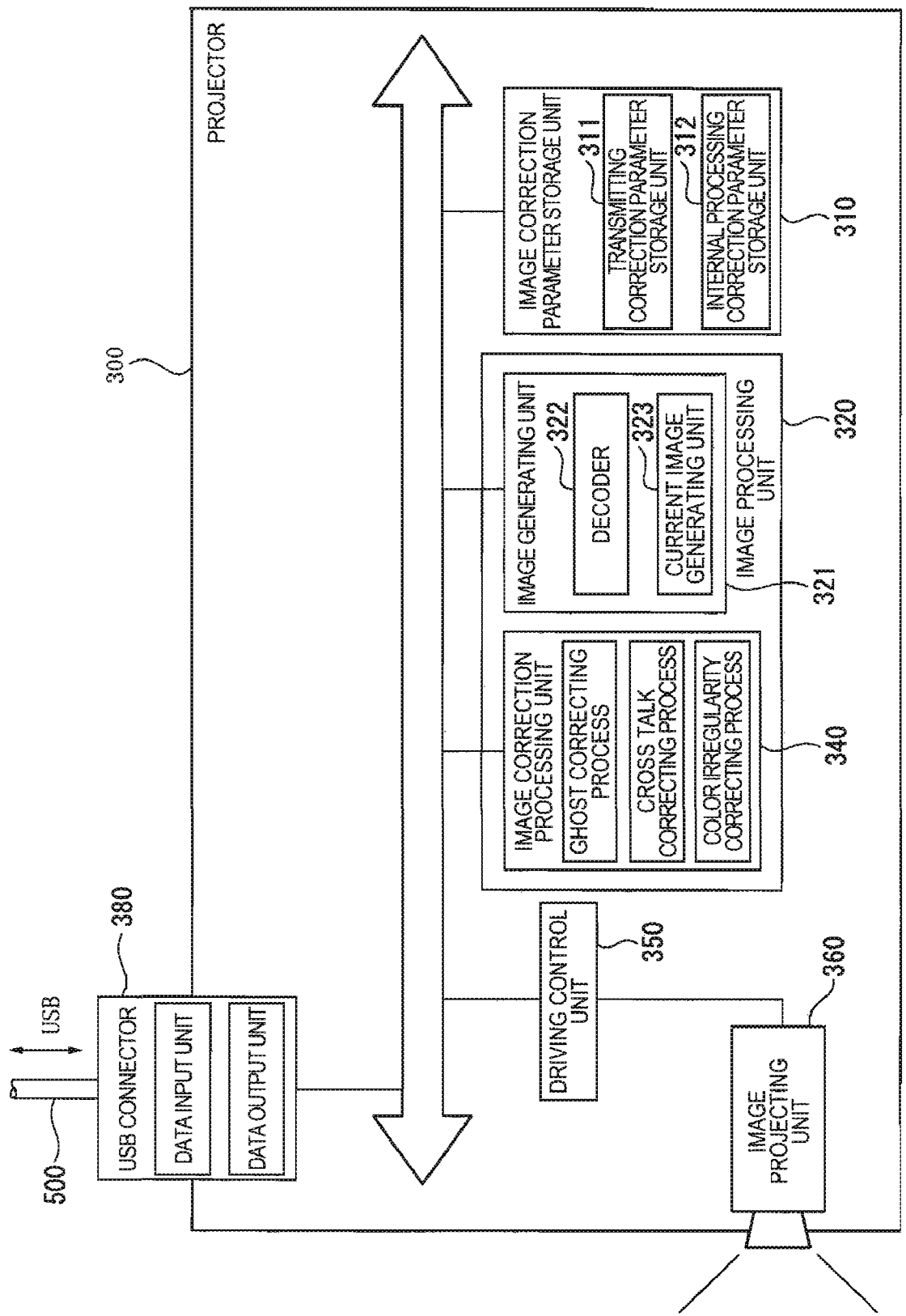
FIG. 3 is a functional block diagram illustrating a projector according to the first embodiment of the invention.

As shown in FIG. 3, projector 300 includes an image correction parameter storage unit 310, an image processing unit 320, a driving control unit 350, an image projecting unit 360, and a USB connector 380.

Image correction parameter storage unit 310 includes a transmitting correction parameter storage unit 311, and an internal processing correction parameter storage unit 312. Transmitting correction parameter storage unit 311 stores parameters used for image correction by personal computer 200, and internal processing correction parameter storage unit 312 stores parameters used for image processing by projector 300.

For example, parameters for resolution conversion, outline emphasis, white/black expansion, color conversion, γ correction, and VT-γ correction are stored in transmitting correction parameter storage unit 311.

When personal computer 200 and projector 300 are operatively connected to each other by signal transmitting member 500, personal computer 200 reads out information of the parameters stored in transmitting correction parameter storage unit 311 and stores the read information in image correction parameter storage unit 210. For example, parameters for cross talk correction, ghost correction, and color irregularity correction are stored in internal processing correction parameter storage unit 312.

In the structure of projector 300, color irregularity caused by other pixels is referred to as cross talk or ghost. The cross talk is irregularity in an image occurring when the pixels are driven by a leakage current between adjacent pixels, and the ghost means an overlap of images deviating from each other.

The reason why projector 300 performs the ghost correction and the cross talk correction is that, when personal computer 200 performs the ghost correction and the cross talk correction, differential data having a large size is generated, so that data transmission is delayed at the transmission rate of signal transmitting member 500.

Because it is preferable to correct color irregularity in the last stage, projector 300 corrects the ghost and the cross talk and then corrects the color irregularity.

Image processing unit 320 includes an image generating unit 321 and an image correction processing unit (second image correction processing unit) 340. Image generating unit 321 includes a decoder 322 and a current image generating unit 323.

Decoder 322 demodulates the image data signal transmitted from personal computer 200. That is, the image data signal transmitted from personal computer 200 is encoded by encoder 260 and is then demodulated by decoder 322, thereby obtaining the differential data.

Current image generating unit 323 synthesizes the demodulated differential data with the image data being currently projected to generate a new current image frame.

Image correction processing unit 340 performs, for example, various correction processes such as a cross talk correcting process, a ghost correcting process, and a color irregularity correcting process, on the current image data generated by current image generating unit 323.

Driving control unit 350 outputs a control signal for driving image projecting unit 360 to display the current image frame.

Figure 4:
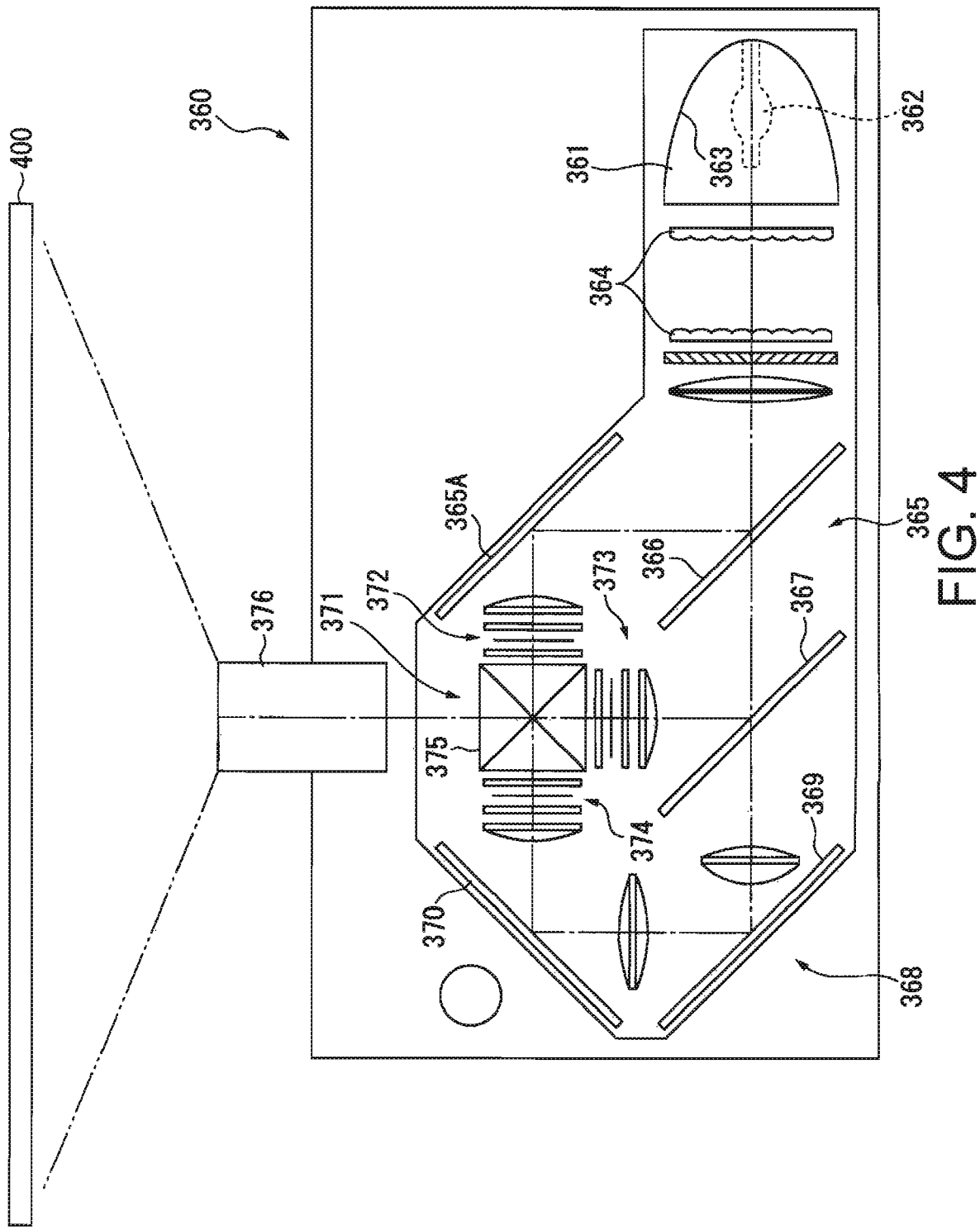
FIG. 4 is a diagram illustrating the structure of an image projecting unit according to the first embodiment of the invention.

As shown in FIG. 4, image projecting unit 360 includes a light source unit 361. Light emitted from a light source 362 is collimated into a beam by a reflector 363, and the collimated beam passes through two lens arrays 364 and travels toward a color separating optical system 365. Color separating optical system 365 includes a dichroic mirror 366 for reflecting a red light beam and transmitting blue and green light beams and a dichroic mirror 367 for reflecting the green light beam and transmitting the blue light beam. Color separating optical system 365 separates light into red, green, and blue light beams. The red light beam is reflected from a reflecting mirror 365A, the green light beam is reflected from dichroic mirror 367, and the blue light beam is guided to a relay optical system 368 including two reflecting mirrors 369 and 370. Then, the three light beams are incident on a red liquid crystal panel (light modulating device) 372, a green liquid crystal panel (light modulating device) 373, and a blue liquid crystal panel (light modulating unit) 374 of an electro-optical device 371, respectively. The incident color light beams are optically modulated in liquid crystal panels 372 to 374 on the basis of image information, and the modulated light beams are combined into an image by a prism 375.

The combined image is emitted from a projection optical system 376, is enlarged, and is then projected onto screen 400.

Figure 5:
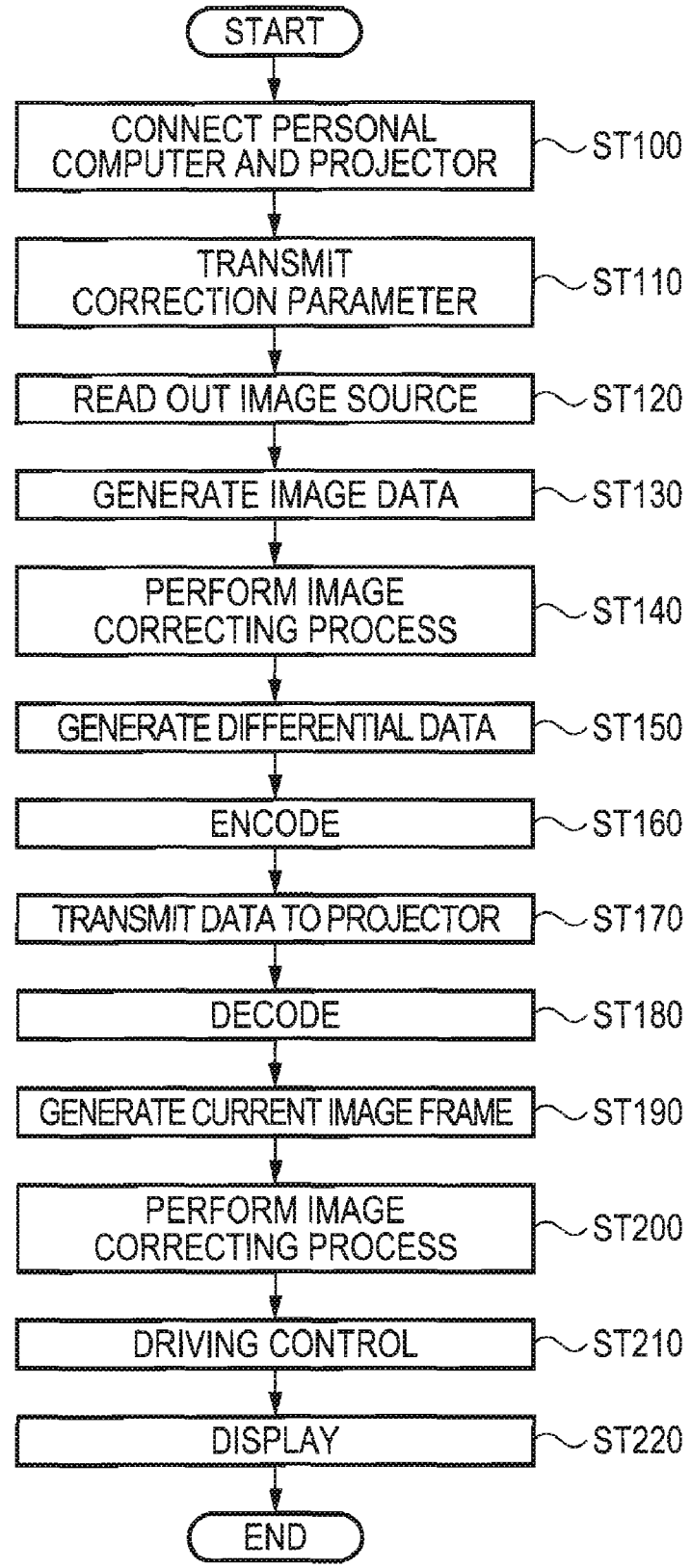
FIG. 5 is a flow chart illustrating a process of projecting an image source to the projector according to the first embodiment of the invention.

The operation of the first embodiment having the above-mentioned structure will be described below with reference to the flow chart shown in FIG. 5.

First in step ST100, personal computer 200 and projector 300 are operatively connected to each other by signal transmitting member 500. In step ST110, various correction parameters stored in the transmitting correction parameter storage unit of projector 300 are transmitted to personal computer 200 via signal transmitting member 500, and are then stored in image correcting parameter storage unit 210 of personal computer 200.

In step ST120, the image source is read out from the DVD of auxiliary memory 203. Then, in step ST130, image generating unit 230 performs decoding or IP conversion on the image source to generate image data.

In step ST140, image correction processing unit 340 performs an image correcting process on the image data.

That is, image correction processing unit 340 performs, for example, a resolution converting process, an outline emphasizing process, a white/black expanding process, a color converting process, a γ correcting process, and a VT-γ correcting process on the image data. In addition, image correction processing unit 340 performs a shape correcting process on the image data.

The corrected image data is sequentially transmitted to differential data generating unit 250. In step ST150, differential data generating unit 250 compares the previous image and the latest image.

Then, the spatial and color variations between the previous image and the latest image are detected as differential data.

In step ST160, the differential data generated by differential data generating unit 250 is encoded by encoder 260. In step ST170, the encoded differential data is transmitted to projector 300 via signal transmitting member 500.

In step ST180, the data signals of the transmitted differential data are demodulated by decoder 322. In step ST190, current image generating unit 323 synthesizes the demodulated differential data with the current image frame data being currently projected to generate the next current image frame.

In step ST200, image correction processing unit 340 corrects the generated current image frame. That is, image correction processing unit 340 performs a cross talk correcting process, a ghost correcting process, and a color irregularity correcting process on the generated current image frame.

In step ST210, driving control unit 350 outputs a control signal to image projecting unit 360 to display the corrected current image data. In step S220, the image projecting unit projects an image onto the screen, so that the image is displayed on the screen.

According to the first embodiment having the above-mentioned structure, the following effects can be obtained. (1) Image correction processing unit 240 of personal computer 200 performs the resolution converting process, the outline emphasizing process, the white/black expanding process, the color converting process, the γ correcting process, the VT-γ correcting process, and the shape correcting process except for the ghost correcting process and the cross talk correcting process. Therefore, personal computer 200 mainly performs correction in the units of pixels forming an image, and personal computer 200 just performs predetermined conversion on data of each pixel. Thus, the difference between a compression ratio when image data of the original image before the correcting process is compressed and a compression ratio when image data of the image after the correcting process is compressed is not large. When the image data corrected by personal computer 200 is compressed and the compressed image data is transmitted to projector 300 via signal transmitting member 500, projector 300 can display an image at an appropriate frame rate.

(2) Personal computer 200 performs correcting processes other than the ghost correcting process and the cross talk correcting process, and projector 300 performs the ghost correcting process and the cross talk correcting process. Therefore, it is possible to perform all necessary image correcting processes and thus to improve the display quality of an image.

(3) The image data is appropriately compressed on the basis of the differential data, and the compressed image data is transmitted from personal computer 200 to projector 300 via signal transmitting member 500, which makes it possible to transmit all data from personal computer 200 to projector 300 without omitting any information. Therefore, projector 300 can display a high-resolution image on the basis of image data having high-accuracy information.

(4) Because personal computer 200 performs image correcting processes other than the ghost correcting process and the cross talk correcting process, it is possible to reduce the image correction processing load of projector 300. Therefore, it is possible to simplify the structure of projector 300 and to realize an inexpensive image display apparatus.

(5) Because personal computer 200 for performing image correcting processes has a graphic processing function, an additional image processing function is not needed.

The graphic processing function, of personal computer 200 makes it possible to process images at high speed and with high accuracy.

(6) Since it is the most effective to perform the color irregularity correcting process in the last stage, projector 300 performs the color irregularity correcting process in the last stage, which makes it possible to effectively perform an image correcting process at the highest speed.

(7) When personal computer 200 is operatively connected to projector 300, personal computer 200 can acquire correction parameters from projector 300. Therefore, personal computer 200 can acquire different correction parameters depending on the hardware structures of individual projectors and perform correcting processes corresponding to the individual projectors.

Although the embodiment of the invention has been described below, the invention is not limited thereto. For example, various modifications and changes of the invention can be made without departing from the scope and spirit of the invention.

For example, projector 300 may perform only the ghost correcting process. Alternatively, projector 300 may perform only the cross talk correcting process.

Projector 300 may perform any one of the resolution converting process, the outline emphasizing process, the white/black expanding process, the color converting process, the γ correcting process, the VT-γ correcting process, and the shape correcting process that are performed by the information processing apparatus.

The image display apparatus is not limited to projector 300. For example, any image display apparatuses may be used as long as they can display images by using a CRT or a liquid crystal display.

In this embodiment, although a method of compressing image data using the differential data has been described above, but the invention is not limited thereto. Other image data compressing methods may be used.

The invention can be applied to an image display system. For example, the invention can be applied to a projection system.

What is claimed is:

1. An image display system, comprising:
   an information processing apparatus that performs a predetermined image correcting process on image data;
   an image display apparatus that displays an image on the basis of the corrected image data; and
   a signal transmitting member that operatively connects the information processing apparatus and the image display apparatus and transmits signals therebetween,
   wherein the information processing apparatus includes:
   a first image correction processing unit that performs the predetermined image correcting process on the image data; and
   a transmission data generating unit that compresses the corrected image data to generate transmission data to be transmitted to the image display apparatus via the signal transmitting member, and
   wherein the image display apparatus includes:
   an image generating unit that generates display data on the basis of the transmission data;
   a second image correction processing unit that performs at least one of display image correcting processes on the display data, the display image correcting processes including a ghost correcting process and a cross talk correcting process, and
   the first image correction processing unit performs the predetermined image correcting process exclusive of at least one of the display image correcting processes to be performed by the second image correction processing unit.

2. The image display system according to claim 1, wherein the display image correcting processes further comprises a color irregularity correcting process.

3. The image display system according to claim 1, wherein the information processing apparatus further comprises:
   an image correction parameter storage unit that receives, from a source, image correction parameters that are used by the first image correction processing unit to perform the predetermined image correcting process and stores the image correction parameters.

4. The image display system according to claim 1, wherein the image generating unit of the image display apparatus further comprises:
   an image synthesizing unit that synthesizes the display data based on the transmission data and a previous image data, wherein the transmission data contains a differential between the previous image data and the display data.

5. The image display system according to claim 1, wherein the transmission data generating unit of the information processing apparatus further comprises:
   an image differential calculation unit that calculates the transmission data which includes a differential between a previous image data and the corrected image data.

6. The image display system according to claim 5, wherein the image generating unit of the image display apparatus further comprises:
   an image synthesizing unit that synthesizes the display data based on the transmission data and the previous image data.

7. An image display apparatus that displays an image on the basis of image data that has been subjected to a predetermined image correcting process by an information processing apparatus that is separate from the image display apparatus and is transmitted from the information processing apparatus via a signal transmitting member, comprising:
   an image correction processing unit that performs at least one of display image correcting processes on the image data, the display image correction processes including a ghost correcting process, a cross talk correcting process and a color irregularity correcting process, wherein
   the ghost correcting process and the cross talk correcting process are not performed by the image processing apparatus before the image data is transmitted to the image display apparatus.

8. An image display apparatus for displaying an image on the basis of image data, comprising:
   an image generating unit that generates display data on the basis of the image data received from an information processing apparatus via a signal transmitting member that operatively connects the image display apparatus to the information processing apparatus;
   an image synthesizing unit that synthesizes the display data based on the transmission data and a previous image data, the transmission data contains a differential between the previous image data and the display data;
   a display image correction processing unit that performs at least one of display image correcting processes on the display data, the display image correcting processes including a ghost correcting process and a cross talk correcting process; and
   an image display unit that displays a corrected image based on the corrected display data,
   wherein the information processing apparatus comprises a predetermined image correction processing unit that performs a predetermined image correcting process on the image data and a transmission data generating unit that transmits the corrected image data to the image display apparatus via the signal transmitting member, the predetermined image correction processing unit performs the predetermined image correcting process exclusive of the at least one of the display image correcting processes to be performed by the display image correction processing unit.

9. The image display apparatus according to claim 8, wherein the display image correcting processes further comprises a color irregularity correcting process.

10. The image display apparatus according to claim 8, further comprising:
    an image correction parameter sending unit that sends, to the information processing apparatus, image correction parameters that are used by the predetermined image correction processing unit to perform the predetermined image correcting process.

11. The image display apparatus according to claim 8, wherein the transmission data generating unit of the information processing apparatus further comprises:
    an image differential calculation unit that calculates the transmission data which includes a differential between a previous image data and the corrected image data.

12. The image display apparatus according to claim 11, further comprising:
    an image synthesizing unit that synthesizes the display data based on the transmission data and the previous image data.

13. The image display apparatus according to claim 7, wherein the image display apparatus is a projector.

* * * * *